(12) United States Patent
Won et al.

(10) Patent No.: US 11,928,080 B2
(45) Date of Patent: Mar. 12, 2024

(54) METHOD OF INTEROPERABILITY FOR DATA HUBS BASED ON ACTIVE METADATA MANAGEMENT

(71) Applicant: ELECTRONICS AND TELECOMMUNICATIONS RESEARCH INSTITUTE, Daejeon (KR)

(72) Inventors: Hee Sun Won, Daejeon (KR); Nguyen Minh Chau, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 177 days.

(21) Appl. No.: 17/544,432

(22) Filed: Dec. 7, 2021

(65) Prior Publication Data
US 2022/0179825 A1 Jun. 9, 2022

(30) Foreign Application Priority Data

Dec. 8, 2020 (KR) .................. 10-2020-0170704
Nov. 11, 2021 (KR) .................. 10-2021-0154647

(51) Int. Cl.
*G06F 16/16* (2019.01)

(52) U.S. Cl.
CPC .................. *G06F 16/164* (2019.01)

(58) Field of Classification Search
CPC .................................................. G06F 16/164
(Continued)

(56) References Cited

U.S. PATENT DOCUMENTS

2007/0180470 A1* 8/2007 Gill .................. G06Q 10/08
  348/E7.071
2007/0239771 A1* 10/2007 Shimizu ............ G06F 16/743
  707/999.102
(Continued)

FOREIGN PATENT DOCUMENTS

| KR | 10-2007-0048892 A | 5/2007 |
| KR | 10-2019-0068319 A | 6/2019 |
| KR | 10-2020-0123565 A | 10/2020 |

OTHER PUBLICATIONS

Martin, Trevor P., et al., "Improving Access to Multimedia Using Multi-source Hierarchical Meta-data", AMR 2005, LNCS 3877, © Springer-Verlag, Berlin, Germany, 2006, pp. 266-278.*
(Continued)

*Primary Examiner* — Robert Stevens
(74) *Attorney, Agent, or Firm* — Rabin & Berdo, P.C.

(57) ABSTRACT

Disclosed are an electronic device and a non-transitory computer-readable storage medium. Conventionally, most of institutions, companies, etc. have defined and used their own data standards for the business purposes. Most of the data is stored in relational database in a structured format. Now as convergence between industries, new business and new data increases, an active data management system is becoming necessary. The electronic devices according to the disclosure can provide data hub device providing automatically extendable data management function interworking with an open data reference model management device (an active metadata management). Accordingly, the data hubs can exchange standardized data maps among them so as to quickly adapt to such changes in the open industry environment.

18 Claims, 10 Drawing Sheets

(58) Field of Classification Search
USPC .......................................................... 707/822
See application file for complete search history.

(56) References Cited

U.S. PATENT DOCUMENTS

| | | | | |
|---|---|---|---|---|
| 2009/0327205 | A1* | 12/2009 | Sweeney | G06F 16/84 |
| | | | | 706/54 |
| 2011/0191304 | A1* | 8/2011 | Ristow | G06F 16/00 |
| | | | | 707/752 |
| 2011/0314035 | A1* | 12/2011 | Brunet | G06F 16/172 |
| | | | | 709/206 |
| 2012/0330869 | A1* | 12/2012 | Durham | G06N 5/022 |
| | | | | 706/16 |
| 2014/0075004 | A1* | 3/2014 | Van Dusen | G06N 20/00 |
| | | | | 709/223 |
| 2014/0304263 | A1* | 10/2014 | Vaitheeswaran | G06F 16/285 |
| | | | | 707/737 |
| 2018/0052870 | A1* | 2/2018 | Stojanovic | G06F 8/4452 |
| 2018/0052878 | A1* | 2/2018 | Seetharaman | G06Q 10/0637 |
| 2018/0067732 | A1* | 3/2018 | Seetharaman | G06F 3/0649 |
| 2018/0373953 | A1* | 12/2018 | Tomotaki | G06T 7/0002 |
| 2020/0201865 | A1* | 6/2020 | Siebeking | G06F 9/541 |

OTHER PUBLICATIONS

Velegrakis, Yannis, et al., "Mapping Adaptation under Evolving Schemas", Proc. of the 29th VLDB Conf., Berlin, Germany, © 2003, pp. 584-595.*

Ahmed, Waqas, et al., "Using Ontologies to Synchronize Change in Relational Database Systems", Journal of Research and Practice in Information Technology, vol. 43, No. 2, May 2011, pp. 89-107.*

* cited by examiner

FIG. 4

```
                Data Map 1 DTMP1

- Dataset 1
    - Domain: Healthcare
    - Classification System: Health and Medical Treatment
    - Category: Health Environment
    - Profile:
        · Test Material: Residual Pesticide
        · Target: Agricultural Products

- Dataset 2
    - Domain: Healthcare
    - Classification System: Health and Medical Treatment
    - Category: Medical Treatment/Disease
    - Profile:
        · Medical Institution: Internal Medicine
        · Age Range: Thirties
        · Region: Daejeon
        · Disease Classification: Infectious Disease
        · Medicine: General Drug

- Dataset 3
    - Domain: Healthcare
    - Classification System: Health and Medical Treatment
    - Category: Health Environment
    - Profile:
        · Test Material: Radiation
        · Target: Seafood
```

METHOD OF INTEROPERABILITY FOR DATA HUBS BASED ON ACTIVE METADATA MANAGEMENT

CROSS-REFERENCE TO RELATED APPLICATIONS

This application claims priority under 35 U.S.C. § 119 to Korean Patent Application No. 10-2020-0170704 filed on Dec. 8, 2020 and Korean Patent Application No. 10-2021-0154647 filed on Nov. 11, 2021, in the Korean Intellectual Property Office, the disclosures of which are incorporated by reference herein in their entireties.

BACKGROUND

Embodiments of the present disclosure described herein relate to an electronic device and a non-transitory computer-readable storage medium for storing program codes.

At home and abroad, data open has been expanded to the private sector as well as the public sector. Cases that data-based decision-making accuracy and existing processes have been improved are being introduced. Furthermore, as the number of startups pioneering new business models through the convergence between industries increases, the creation and open of various pieces of data is required for society and industry, and new IoT devices such as mobile devices and sensors are also emerging. As such, to exchange and utilize data with institutions, each institution is opening data by applying standards established at home and abroad or applying an independent management system to a system. For this reason, as data sources and data types become more diverse and vast, a data management system is expanding to add information necessary for understanding and utilizing data. Accordingly, a data open format gradually becomes heterogeneous in a standard model, and data interoperability with other institutions may deteriorate.

Generally, specific institutions, companies, and the like define and use data standards for independently sharing and processing data for work progress. In most cases, standardized data stored in a relational database is processed, and thus it is possible to maintain and fix the database without major changes in a data format. However, nowadays, new data is created due to convergence between industries and data-based new industries, and unstandardized data or external data are being used increasingly. There is a need for a data management system capable of coping with this phenomenon.

SUMMARY

Embodiments of the present disclosure provide an electronic device including an open data reference model management device and a data hub device, and a non-transitory computer-readable storage medium for storing program codes.

According to an embodiment, an electronic device includes an open data reference model management device that subdivides and manages a classification system for each domain of an open data reference model into categories of a hierarchical structure and a data hub device that collects a first dataset based on the open data reference model, stores the first dataset, and generates a first data map based on the first dataset. Profile information of the first dataset includes metadata information of a profile specification of a first category of the open data reference model and metadata information of a profile specification of a second category, which is an upper category of the first category.

According to an embodiment, in a non-transitory computer-readable storage medium storing a program code capable of being executed by a processor, the program code causes the processor to collect a first dataset based on an open data reference model, to store the first dataset, and to generate a first data map based on the first dataset. Profile information of the first dataset includes metadata information of a profile specification of a first category of the open data reference model and metadata information of a profile specification of a second category, which is an upper category of the first category.

BRIEF DESCRIPTION OF THE FIGURES

The above and other objects and features of the present disclosure will become apparent by describing in detail embodiments thereof with reference to the accompanying drawings.

FIG. 4 illustrates a structure of a data map distributed by a data hub of FIG. 3, according to an embodiment of the present disclosure.

DETAILED DESCRIPTION

Hereinafter, embodiments of the present disclosure will be described in detail and clearly to such an extent that an ordinary one in the art easily implements the present disclosure.

Hereinafter, the best embodiment of the present disclosure will be described in detail with reference to accompanying drawings. With regard to the description of the present disclosure, to make the overall understanding easy, similar components will be marked by similar reference signs/numerals in drawings, and thus, additional description will be omitted to avoid redundancy. In the detailed description or drawings, the terms "unit", "engine", "module", etc. or function blocks performing various operations may be implemented with software, firmware, a hardware circuit, or various combinations thereof.

Figure 1:
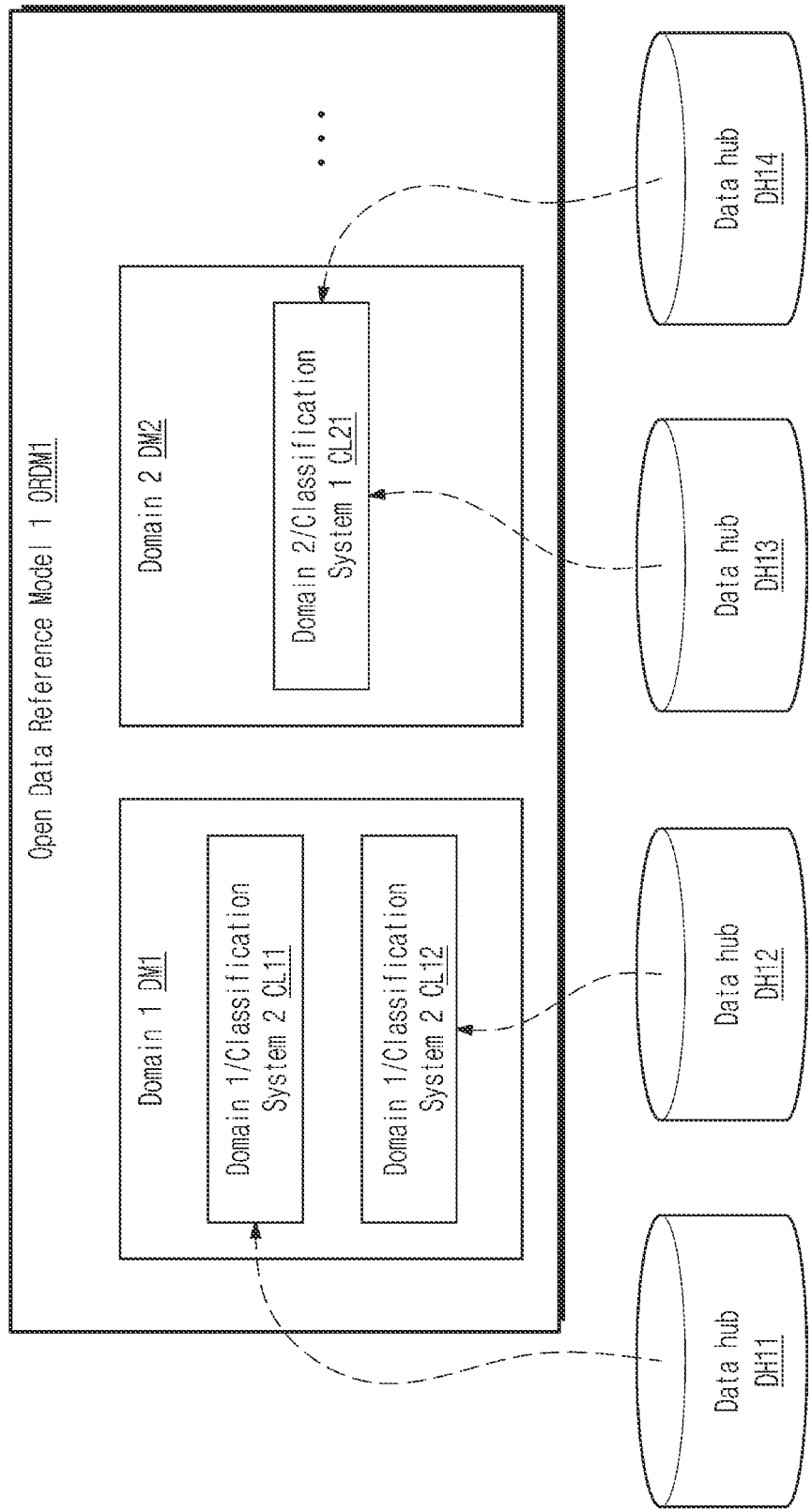
FIG. 1 illustrates a block diagram of a system, according to an embodiment of the present disclosure.

FIG. 1 illustrates a block diagram of a system 10, according to an embodiment of the present disclosure. Referring to FIG. 1, the system 10 may manage an open data reference model ODRM1 and data hubs DH11, DH12, DH13, and DH14.

In some embodiments, the system 10 may divide various fields such as a public sector or a private sector into domains and may organize each of one or more classification systems of each domain into hierarchically subdivided category(s). Accordingly, the system 10 may manage and open (or share) a profile specification of an individual dataset for each of the categories. In some embodiments, the system 10 may manage the open data reference model ODRM1 so as to manage and distribute data information of various domains by using common vocabularies and terms. The system 10 may collect and distribute a data map that describes a dataset according to a profile specification of an individual dataset through the data hubs DH11, DH12, DH13, and DH14.

In the embodiment of FIG. 1, it is illustrated that the system 10 manages one of the open data reference model ODRM1 and the four data hubs DH11, DH12, DH13, and DH14, but embodiments of the present disclosure are not limited thereto. For example, in some embodiments, the system 10 may manage a plurality of open data reference models. As another example, in some embodiments, the system 10 may manage one or more data hubs.

The open data reference model ODRM1 may include one or more domains (e.g., a domain DM1 and a domain DM2). Each of the domains DM1 and DM2 of the open data reference model ODRM1 may have one or more classification systems. For example, the domain DM1 may have two classification systems CL11 and CL12. The domain DM2 may have one classification system CL21.

The classification systems CL11, CL12, and CL21 may have different categories, each of which has a different configuration method. For example, in the same domain DM1, categories constituting the classification system CL11 may be different from categories constituting the classification system CL12. As another example, among different domains DM1 and DM2, the categories constituting the classification system CL11 may be different from the categories constituting the classification system CL21.

Each of the classification systems CL11, CL12, and CL21 may include one or more hierarchical categories. For example, each of the classification systems CL11, CL12, and CL21 may include the highest layer starting from one or more independent categories. The categories of classification systems CL11, CL12, and CL21 will be described below in detail with reference to FIG. 2.

Each of the data hubs DH11, DH12, DH13, and DH14 may include one or more datasets. Each dataset may include data described based on the profile specification of the associated category. For example, the data hub DH1 may include a dataset based on a profile specification of at least one of categories included in the classification system CL11 of the domain DM1. The data hub DH2 may include a dataset based on a profile specification of at least one of categories included in the classification system CL12 of the domain DM1. The data hub DH3 may include a dataset based on the profile specification of at least one of the categories included in the classification system CL12 of the domain DM1 and a dataset based on the profile specification of at least one of the categories included in the classification system CL21 of the domain DM2. The data hub DH4 may include a dataset based on a profile specification of at least one of categories included in the classification system CL21 of the domain DM2. An example of a dataset will be described in detail later with reference to FIG. 3.

Figure 2:
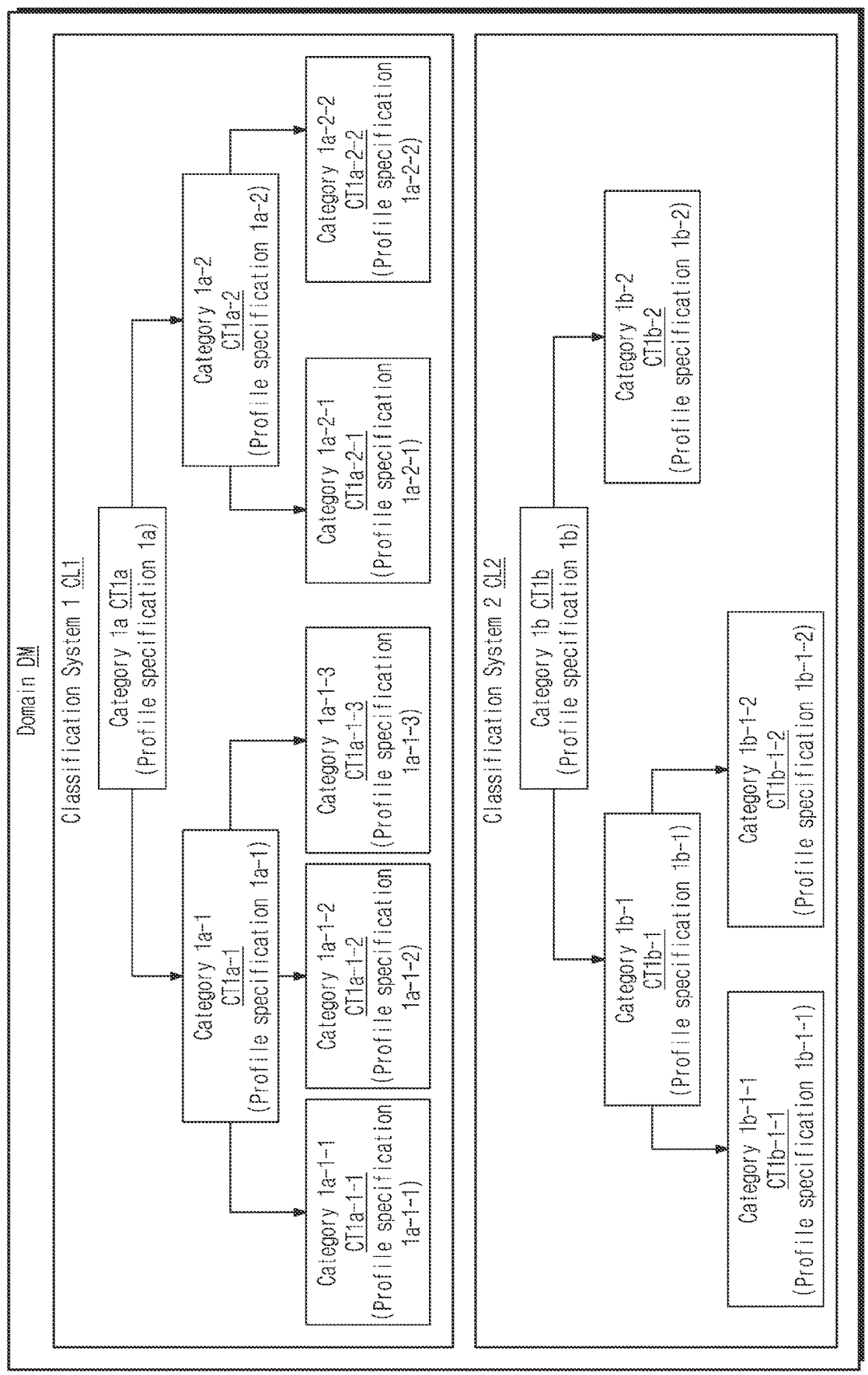
FIG. 2 illustrates a configuration diagram of a domain of an open data reference model capable of being managed by a system of FIG. 1, according to an embodiment of the present disclosure.

FIG. 2 illustrates a configuration diagram of a domain DM of the open data reference model ODRM1 capable of being managed by the system 10 of FIG. 1, according to an embodiment of the present disclosure. Referring to FIGS. 1 and 2, the domain DM may be divided into classification systems CL1 and CL2 (or may include classification systems CL1 and CL2).

The classification system CL1 may have the highest layer of two categories CT1a and CT1b. The category CT1a may be subdivided into two categories CT1a-1 and CT1a-2. The category CT1a-1 may be subdivided into three categories CT1a-1-1, CT1a-1-2, and CT1a-1-3. The category CT1a-2 may be subdivided into two categories CT1a-2-1 and CT1a-2-2.

The classification system CL2 may have the highest layer of one category CT1b. The category CT1b may be subdivided into two categories CT1b-1 and CT1b-2. The category CT1b-1 may be subdivided into two categories CT1b-1-1 and CT1b-1-2.

Each category may have an individual (or unique) profile specification. In other words, the profile specification may be defined differently for each category. For example, the profile specification of the category CT1a-1 may be different from the profile specification of the category CT1a-2. The profile specification may be implemented as a metadata schema for describing various types of information such as a title, quality, format, license, or association of a dataset included in (or related to) the corresponding category. A category and profile specification will be described in more detail with reference to FIG. 3.

Figure 3:
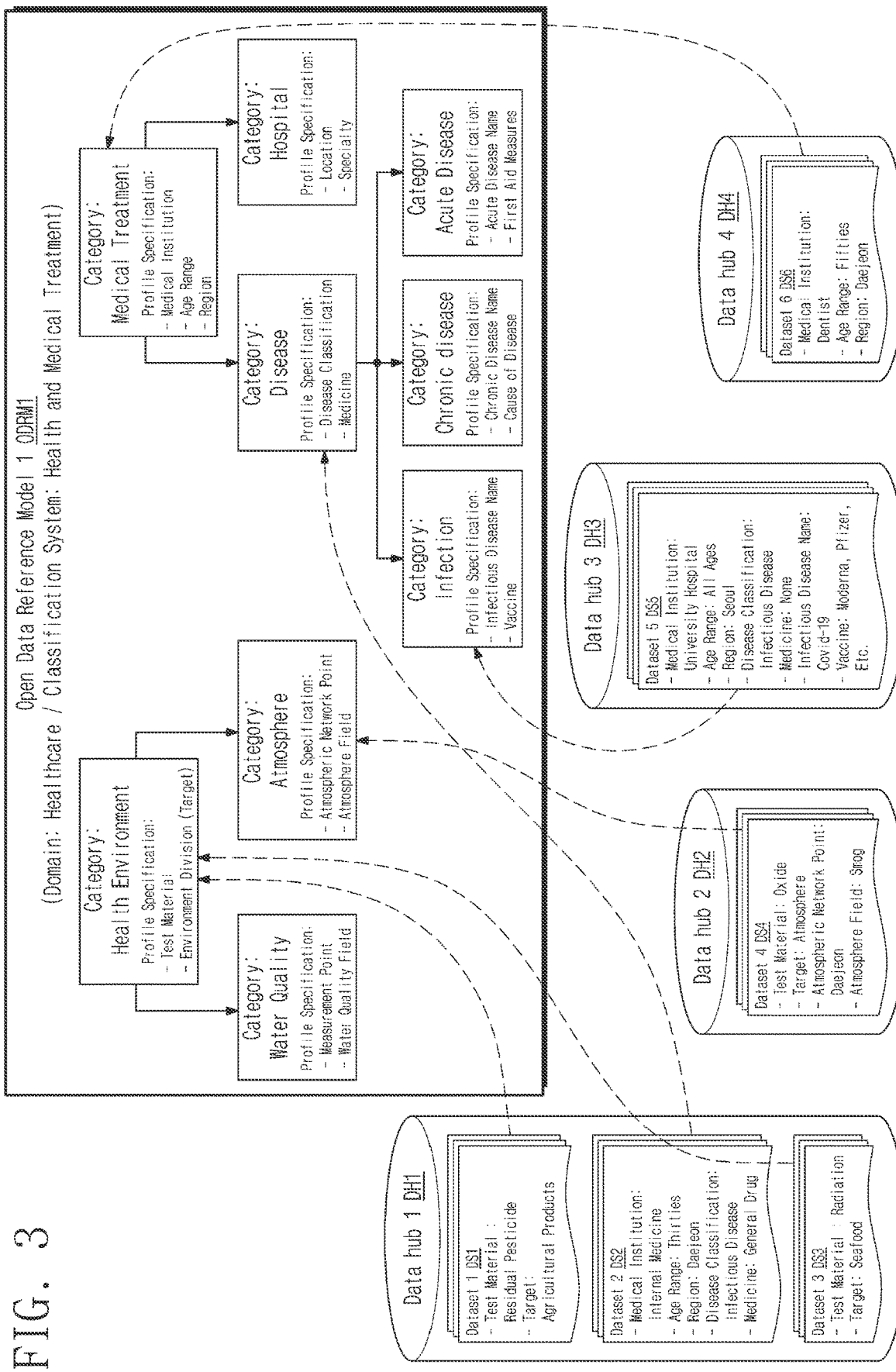
FIG. 3 illustrates a classification system of another domain of an open data reference model of FIG. 1 and data hubs associated therewith, according to an embodiment of the present disclosure.

FIG. 3 illustrates a classification system of another domain of the open data reference model ODRM1 of FIG. 1 and the data hubs DH1, DH2, DH3, and DH4 associated therewith, according to an embodiment of the present disclosure. Referring to FIGS. 1 and 3, the open data reference model ODRM1 may include a 'healthcare' domain. The 'healthcare' domain may include a 'health and medical treatment' classification system. The 'health and medical treatment' classification system may have the highest layer of a 'health environment' category and a 'medical treatment' category. The 'health environment' category may be subdivided into a 'water quality' category and an 'atmosphere' category. The 'medical treatment' category may be subdivided into a 'disease' category and a 'hospital' category. The 'disease' category may be subdivided into an 'infection' category, a 'chronic disease' category, and an 'acute disease' category.

Each category may have an individual profile specification. For example, the profile specification of the 'health environment' category may be defined as a 'test material' and an 'environment division (or target)'. A profile specification of the 'water quality' category among subcategories of the 'health environment' category may be defined as a 'measurement point' and a 'water quality field'. A profile specification of the 'atmosphere' category, which is another sub-category of the 'health environment' category, may include an 'atmospheric network point' and an 'atmosphere field'.

Each of datasets DS1, DS2, DS3, DS4, DS5, and DS6 included in data hubs DH1, DH2, DH3, and DH4 may be described as metadata information that is defined in a profile specification of the corresponding category and profile specifications of upper layers of the category. In other words, one dataset (alternatively, as another example, a profile of one dataset) may include metadata defined in a profile specification of the corresponding category (alternatively, related to the category or assigned to the category) and metadata defined in a profile specification of each of upper categories of the category. Alternatively, the one dataset may include metadata defined in a profile specification of one corresponding category and metadata defined in a profile specification of each of the upper categories.

For example, the dataset DS1 of the data hub DH1 may correspond to the 'health environment' category. The dataset DS1 may include 'residual pesticide', which is metadata information of a 'test material' defined in the profile specification of the 'health environment' category, and 'agricultural products', which are metadata information of the 'environment division (or target)'.

In a similar manner, the dataset DS3 may include metadata information of a 'test material' and a 'target' according to a profile specification of the 'health environment' category. The dataset DS6 of the data hub DH4 may include metadata information of a 'medical institution', an 'age range', and a 'region' according to the profile specification of the 'medical treatment' category.

The dataset DS2 of the data hub DH1 may correspond to the 'disease' category. The dataset DS2 may include 'infection disease', which is metadata information of a 'disease classification' defined in a profile specification of the 'disease' category, and a 'general drug' that is metadata information of a 'medicine'. Furthermore, the dataset DS2 may further include metadata information defined in a profile specification of the 'medical treatment' category, which is an upper category of the 'disease' category. For example, the dataset DS2 may further include an 'internal medicine' which is metadata information of 'medical institution' defined in a profile specification of the 'medical treatment' category, 'thirties' which are metadata information of an 'age range', and 'Daejeon' that is metadata information of a 'region'.

In a similar manner, as well as metadata of an 'atmospheric network point' and an 'atmosphere field' according to a profile specification of the 'atmosphere' category, the dataset DS4 of the data hub DH2 may also include metadata of a 'test material' and a 'target' according to a profile specification of the 'health environment' category, which is the upper category.

In a similar manner, as well as metadata of an 'infectious disease name' and a 'vaccine' according to the profile specification of the 'infection' category, the dataset DS5 of the data hub DH3 may include metadata of a 'disease classification' and a 'medicine' according to a profile specification of the 'disease' category, which is the upper category, and metadata of a 'medical institution', an 'age range', and a 'region', which are 'medical treatment' category that is the highest category.

One data hub may be associated with a plurality of categories. For example, the data hub DH1 having the datasets DS1, DS2, and DS3 may be associated with 'disease' category as well as 'health environment' category. Moreover, one data hub may be associated with a plurality of classification systems or a plurality of domains. In other words, one data hub may collect, generate, or distribute datasets of a plurality of domains, classification systems, or categories. In this case, each dataset may inherit the metadata defined in the profile specification of the next upper layer.

FIG. 4 illustrates a structure of a data map DTMP1 distributed by the data hub DH1 of FIG. 3, according to an embodiment of the present disclosure. Referring to FIGS. 1 to 4, the data map DTMP1 may include information of the datasets DS1, DS2, and DS3 included in the data hub DH1. The data hub DH1 may collect the datasets DS1, DS2, and DS3, may generate the data map DTMP1 based on the collected datasets DS1, DS2, and DS3, and may distribute the generated data map DTMP1.

Each of the datasets DS1, DS2, and DS3 included in the data map DTMP1 may be described as a corresponding domain, classification system, category (e.g., the corresponding category and upper categories thereof), and profile information thereof. For example, the dataset DS1 may be described in the data map DTMP1 as a 'healthcare' domain, a 'health and medical treatment' classification system, a 'health environment' category, and profile information of 'test material' and 'target'. In a similar manner, the dataset DS2 may be described in the data map DTMP1 as the 'healthcare' domain, the 'health and medical treatment' classification system, a 'medical treatment/disease' category, profile information of a 'disease classification' and a 'medicine', and a 'medical institution', an 'age range' and a 'region' according to a profile specification of an upper category. The dataset DS3 may be described in the data map DTMP1 as the 'healthcare' domain, the 'health and medical treatment' classification system, a 'health environment' category, and profile information of 'test substance' and 'target'.

Figure 5:
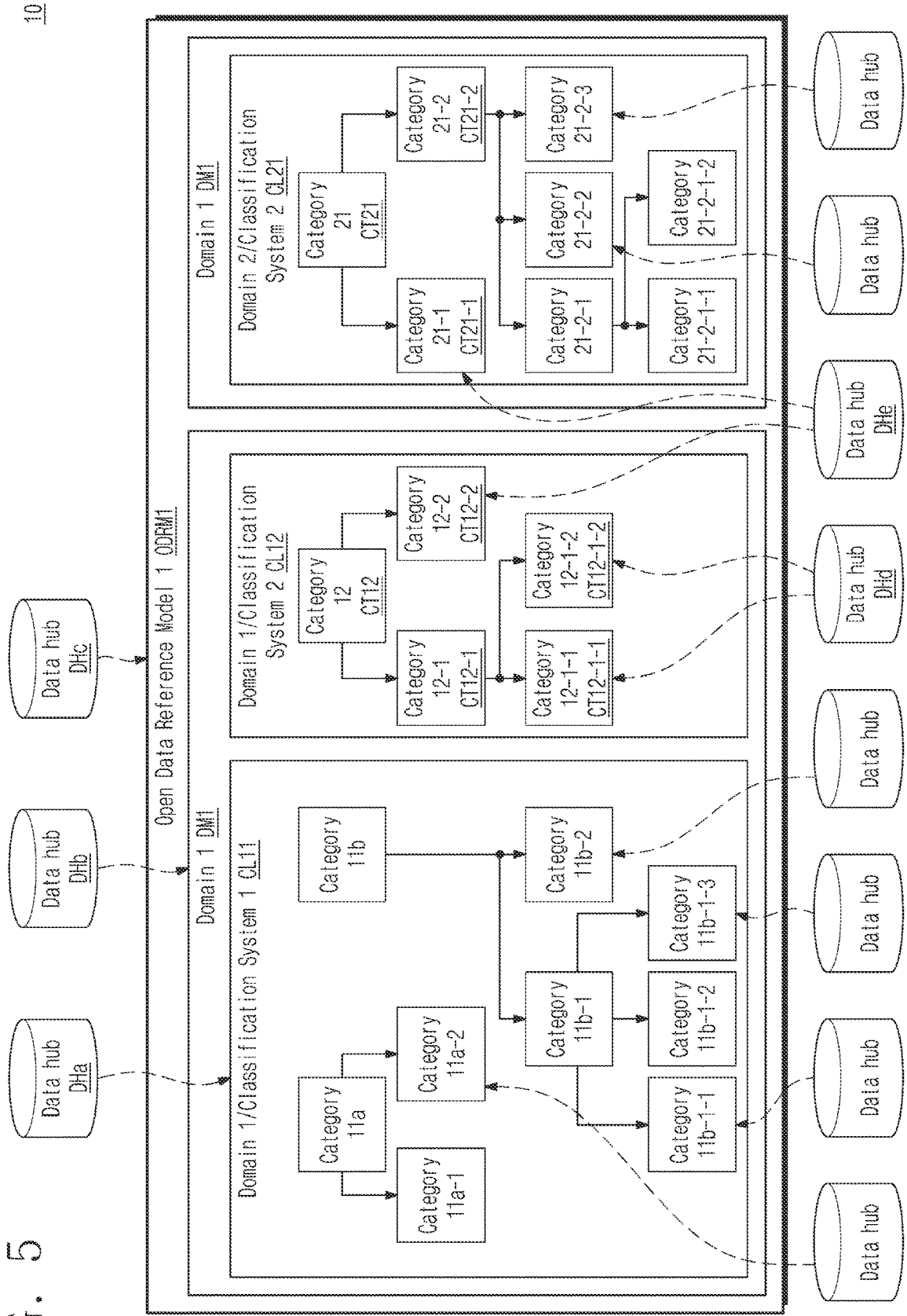
FIG. 5 illustrates an operating environment of an open data reference model and data hubs, which are managed by a system of FIG. 1, according to an embodiment of the present disclosure.

FIG. 5 illustrates an operating environment of the open data reference model ODRM1 and data hubs, which are managed by the system 10 of FIG. 1, according to an embodiment of the present disclosure. Referring to FIGS. 1 and 5, each of a plurality of data hubs (e.g., data hubs DHa, DHb, DHc, DHd, and DHe) may operate in conjunction with the open data reference model ODRM1 so as to collect and share dataset information according to a corresponding profile specification.

Each of the plurality of data hubs may select one or more related fields in units of domains, classification systems, or categories, and may reflect the selection to data management. For example, the data hub DHa may manage data by operating in conjunction with the classification system CL11 of the domain DM1. An arbitrary dataset included in the data hub DHa may include metadata information according to the profile specification of an arbitrary category of the classification system CL11 and metadata information according to the profile specification(s) of the next upper category(s).

The data hub DHb may manage data by operating in conjunction with the domain DM1. For example, an arbitrary dataset included in the data hub DHb may include metadata information according to the profile specification of an arbitrary category of the domain DM1 and metadata information according to the profile specification(s) of the next upper category(s).

The data hub DHc may manage data by operating in conjunction with all domains of the open data reference model ODRM1. For example, an arbitrary dataset included in the data hub DHc may include metadata information according to the profile specification of an arbitrary category of the open data reference model ODRM1 and metadata information according to the profile specification(s) of the next upper category(s).

The data hub DHd may manage data by operating in conjunction with a category CT12-1-1 and a category CT12-1-2 of the classification system CL12 of the domain DM1. In a similar manner as described above with reference to FIGS. 2 to 4, in addition to metadata information according to the profile specification of at least one of the category CT12-1-1 or the category CT12-1-2, an arbitrary dataset included in the data hub DHd may also include metadata information according to the profile specifications of categories CT12-1 and CT12, which are the next upper categories.

In a similar manner, the data hub DHe may manage data by operating in conjunction with the category CT12-2 of the classification system CL12 of the domain DM1 and the category CT21-1 of the classification system CL21 of the domain DM2. For example, one dataset included in the data hub DHe may belong to (or may be related to) a plurality of categories CT12-2 and CT21-1. As well as metadata information according to the profile specifications of categories CT12-2 and CT21-1, the dataset may include metadata information according to the profile specification of the category CT12, which is the next upper category of the category CT12-2, and metadata information according to the profile specification of the category CT21, which is the next upper category of the category CT21-1.

Figure 6:
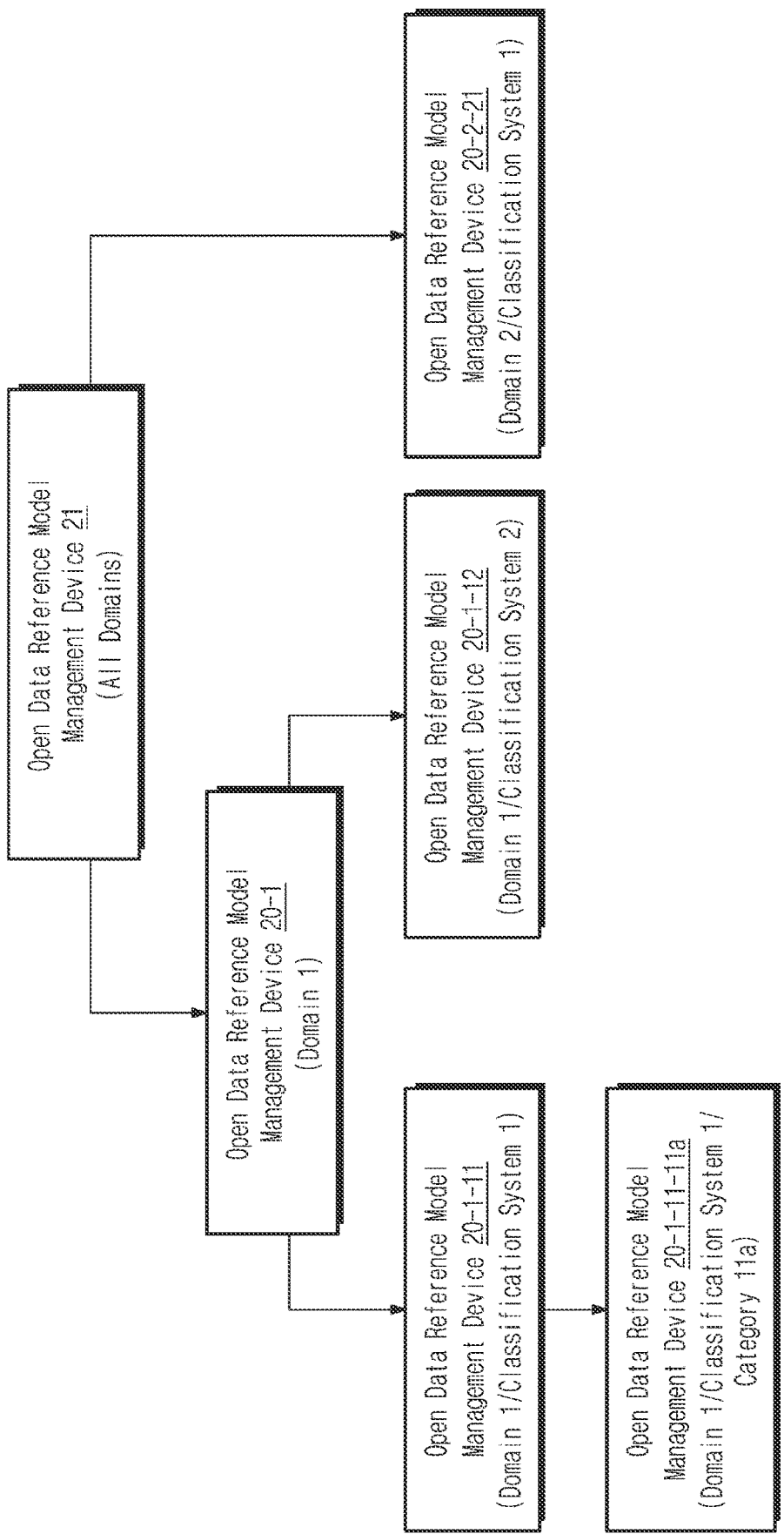
FIG. 6 illustrates a topology of an open data reference model management system operating based on an operating environment of FIG. 4, according to an embodiment of the present disclosure.

FIG. 6 illustrates a topology of an open data reference model management system 20 operating based on the operating environment of FIG. 4, according to an embodiment of the present disclosure. Referring to FIGS. 1, 4, and 6, the open data reference model management system 20 may include hierarchically-constructed open data reference model management devices 21, 20-1, 20-1-11, 20-1-12, 20-2-21, and 20-1-11-11a. In an embodiment of FIG. 6, for convenience of illustration, only some of the open data reference model management devices of the open data reference model management system 20 are illustrated. The open data reference model management system 20 may further include one or more open data reference model management devices.

Each of the open data reference model management devices 21, 20-1, 20-1-11, 20-1-12, 20-2-21, and 20-1-11-11a may select a topic of interest in units of domains, classification systems, or categories. Accordingly, each of the domains, classification systems, and categories of the open data reference model ODFM1 may be independently managed by the corresponding open data reference model management device. For example, the open data reference model management device 21 may manage all domains (e.g., domains DM1 and DM2) of the open data reference model ODRM1. The open data reference model management device 20-1 may manage the domain DM1. The open data reference model management device 20-1-11 may manage the classification system CL11 of the domain DM1. The open data reference model management device 20-1-12 may manage the classification system CL12 of the domain DM1. The open data reference model management device 20-2-21 may manage the classification system CL21 of the domain DM2. The open data reference model management device 20-1-11-11a may manage the '11a' category of the classification system CL11 of the domain DM1.

In some embodiments, each of the open data reference model management devices 21, 20-1, 20-1-11, 20-1-12, 20-2-21, and 20-1-11-11a may include and manage a reference model of domains, classification systems, or categories of a topic of interest and a lower layer of the topic of interest. For example, the open data reference model management device 21 may manage all lower reference models included in the open data reference model ODRM1. For example, the open data reference model management device 21 may expand, delete, or change all domains, classification systems, and categories based on a configuration system of the open data reference model ODRM1. In a similar manner, each of the open data reference model management devices 20-1, 20-1-11, 20-1-12, 20-2-21, and 20-1-11-11a may expand, delete, or change domains, classification systems, or categories of the topic of interest and a lower layer of the topic of interest.

In some embodiments, the open data reference model management devices 21, 20-1, 20-1-11, 20-1-12, 20-2-21, and 20-1-11-11a may operate on a single physical server.

Figure 7:
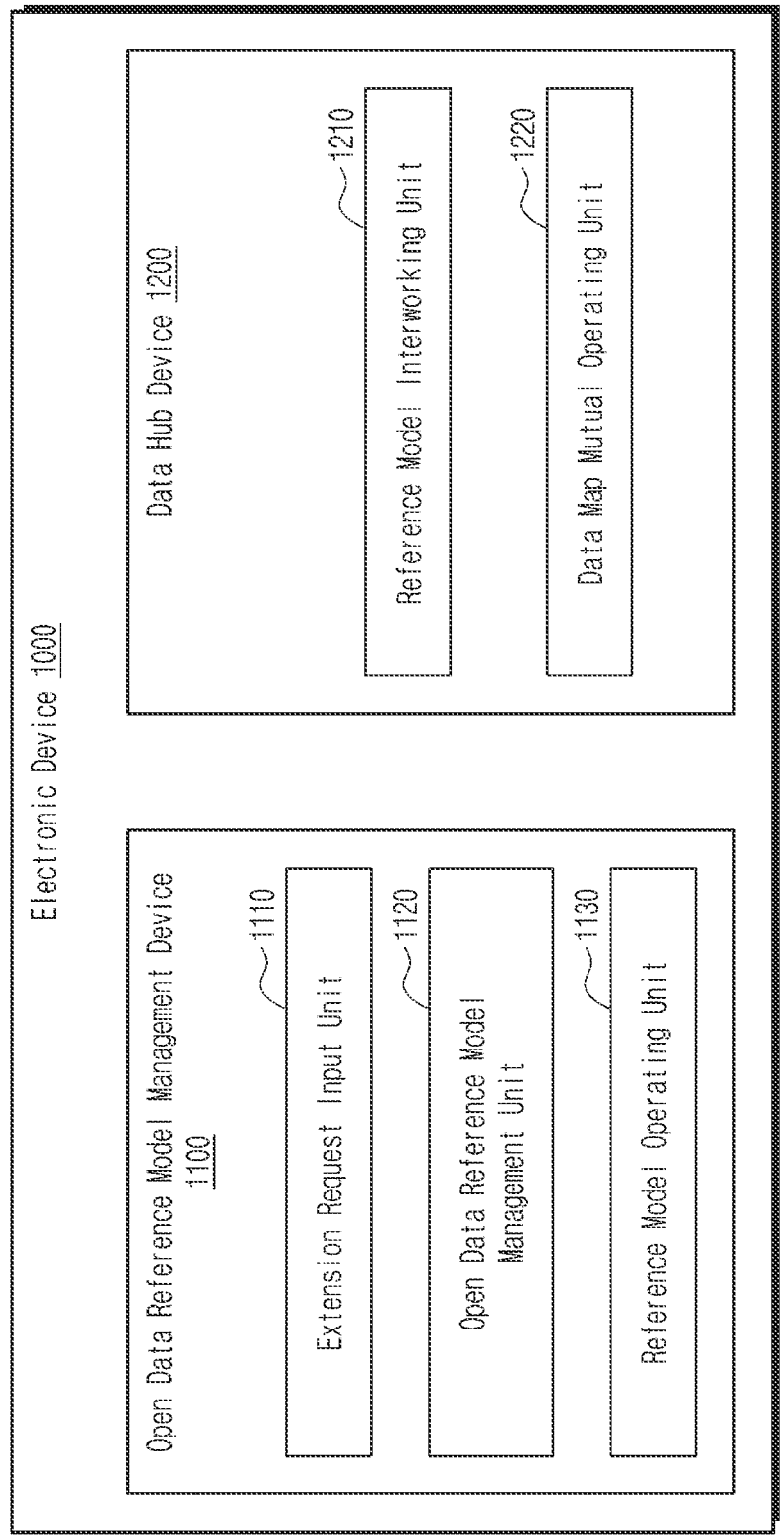
FIG. 7 is a block diagram of an electronic device that manages an open data reference model of FIG. 1 and data hubs operating in conjunction therewith, according to an embodiment of the present disclosure.

FIG. 7 is a block diagram of an electronic device 1000 that manages the open data reference model ODRM1 of FIG. 1 and data hubs (DH11, DH12, DH13, DH14, . . . ) operating in conjunction therewith, according to an embodiment of the present disclosure. Referring to FIGS. 1 and 7, the electronic device 1000 may include an open data reference model management device 1100 and a data hub device 1200. The open data reference model management device 1100 may manage a reference model of the corresponding topic of interest. The data hub device 1200 may manage a dataset of the corresponding topic of interest.

The electronic device 1000 may operate under the operating environment shown in FIG. 6. For example, the open data reference model management devices 21, 20-1, 20-1-11, 20-1-12, 20-2-21, and 20-1-11-11a may be implemented as the open data reference model management device 1100. The data hub device 1200 may manage data hubs operating in conjunction with the corresponding open data reference model management device 1100.

The open data reference model management device 1100 and the data hub device 1200 may operate in conjunction with each other. The open data reference model management device 1100 and the data hub device 1200 may operate in conjunction with each other within the one electronic device 1000 (i.e., within the same physically identical device or system). For example, the open data reference model management device 1100 and the data hub device 1200 may be connected to each other online based on a wired/wireless protocol. In some embodiments, the open data reference model management device 1100 and the data hub device 1200 may be implemented as separate devices.

The open data reference model management device 1100 may include an extension request input unit 1110, an open data reference model management unit 1120, and a reference model operating unit 1130. The extension request input unit 1110 may receive a request associated with extension, reduction, or change of the open data reference model ODRM1 from the outside (e.g., from a user, or the like) of the electronic device 1000. For example, the extension request input unit 1110 may receive, from the outside, a request such as adding a domain, adding a classification system of the domain, adding a category of the classification system, or subdividing an existing category. The extension request input unit 1110 may deliver a metadata schema for the received request to the open data reference model management unit 1120.

In response to the request delivered from the extension request input unit 1110, the open data reference model management unit 1120 may expand, reduce, or change the open data reference model ODRM1. The reference model operating unit 1130 may manage a hierarchically-constructed operating environment topology (e.g., the topology shown in FIG. 6) of the open data reference model ODRM1 and the data hub device 1200 operating in conjunction therewith.

The data hub device 1200 may include a reference model interworking unit 1210 and a data map mutual operating unit 1220. The reference model interworking unit 1210 may perform a synchronization operation with a reference model of a topic of interest of the data hub device 1200. The data map mutual operating unit 1220 may collect a dataset based on a profile specification of the topic of interest of the data hub device 1200, may generate a data map based on the collected dataset, and may distribute the data map.

Figure 8:
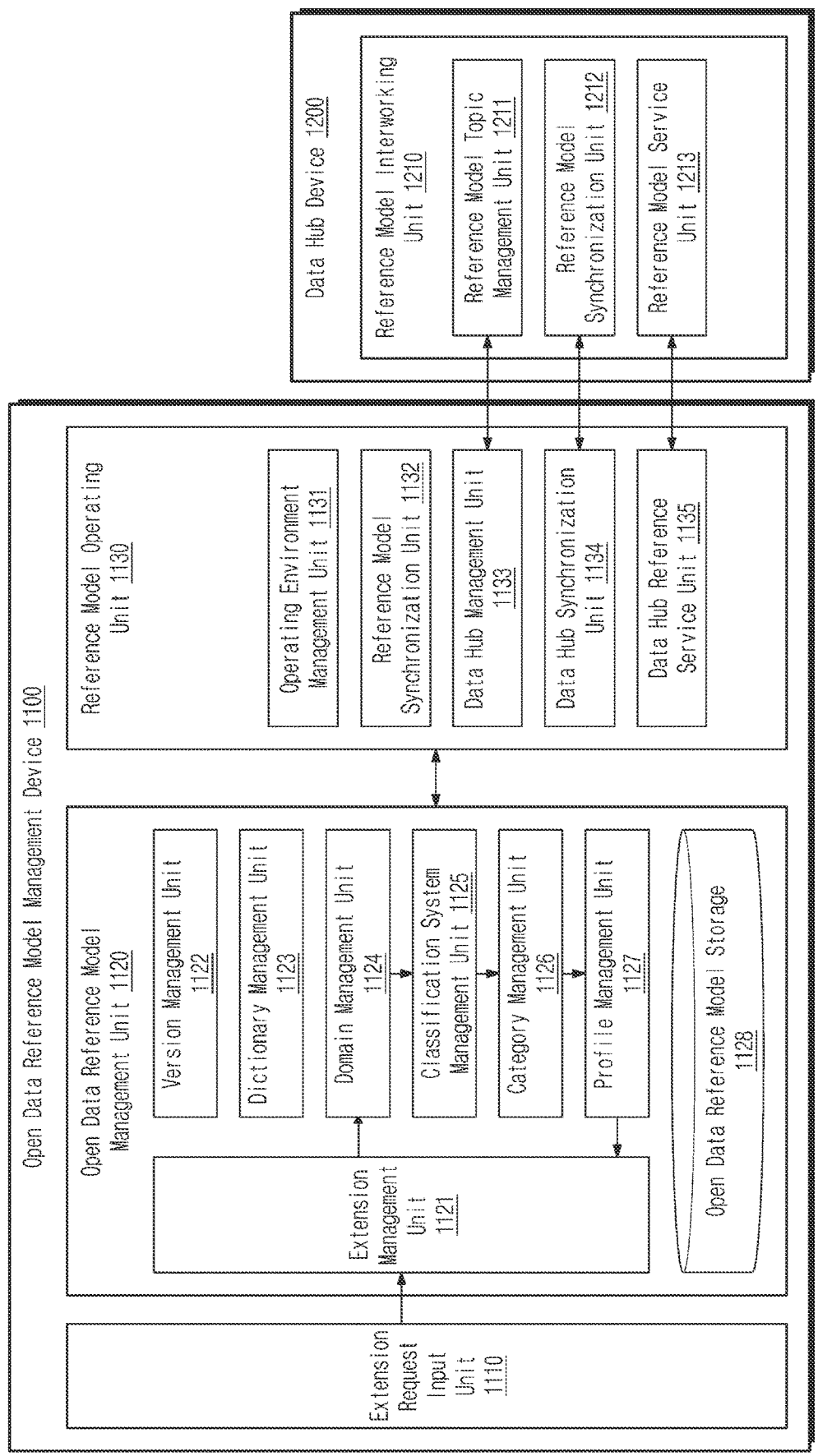
FIG. 8 is a detailed block diagram of an open data reference model management device of FIG. 7, according to an embodiment of the present disclosure.

FIG. 8 is a detailed block diagram of the open data reference model management device 1100 of FIG. 7, according to an embodiment of the present disclosure. Referring to FIGS. 1, 7, and 8, the open data reference model management unit 1120 of the open data reference model management device 1100 may include an extension management unit 1121, a version management unit 1122, a dictionary management unit 1123, a domain management unit 1124, a classification system management unit 1125, a category management unit 1126, a profile management unit 1127, and an open data reference model storage 1128.

The extension management unit 1121 may receive an extension request and a metadata schema corresponding to the extension request from the extension request input unit 1110. The extension management unit 1121 may deliver the received extension request and the received metadata schema to the domain management unit 1124, the classification system management unit 1125, the category management unit 1126, and the profile management unit 1127.

Each of the domain management unit 1124, the classification system management unit 1125, the category management unit 1126, and the profile management unit 1127 may extend the corresponding reference model based on the extension request and the metadata schema. In some embodiments, the domain management unit 1124, the classification system management unit 1125, the category management unit 1126, and the profile management unit 1127 may sequentially extend corresponding reference models. For example, the domain management unit 1124 may modify the reference model of a topic of interest (e.g., a domain, a classification system, or a category) corresponding to the extension request based on the extension request and the metadata schema. The domain management unit 1124 may deliver the modified reference model to the classification system management unit 1125. The classification system management unit 1125 may modify the reference model of the topic of interest corresponding to the extension request, based on the extension request, the metadata schema, and the reference model, which is modified by the domain management unit 1124, and may deliver the modified reference model to the category management unit 1126. The category management unit 1126 may modify the reference model of the topic of interest corresponding to the extension request, based on the extension request, the metadata schema, and the reference model, which is modified by the classification system management unit 1125, and may transmit the modified reference model to the profile management unit 1127.

As described above, in response to the extension request, the open data reference model ODRM1 may be modified through the domain management unit 1124, the classification system management unit 1125, and the category management unit 1126. Each unit may collect results modified by the upper unit and then may deliver the collected results to a lower unit following the unit. The profile management unit 1127 that is the lowest unit may reflect the modification corresponding to the extension request to a metadata schema of the topic of interest corresponding to the extension request with respect to the open data reference model ODRM1 modified through the domain management unit 1124, the classification system management unit 1125, and the category management unit 1126. For example, the profile management unit 1127 may reflect information corresponding to the extension request to a metadata schema of the category corresponding to the extension request or may re-define the profile specification of the corresponding category.

The reference model extended through the domain management unit 1124, the classification system management unit 1125, the category management unit 1126, and the profile management unit 1127 may be delivered again to the extension management unit 1121. The extension management unit 1121 may deliver, to the version management unit 1122 and the dictionary management unit 1123, the corrected results collected through the domain management unit 1124, the classification system management unit 1125, the category management unit 1126, and the profile management unit 1127. The extended reference model may be stored in the open data reference model storage 1128. The open data reference model storage 1128 may be a storage device including a volatile memory or a non-volatile memory, which stores various open data reference models (e.g., the open data reference model ODRM1).

The version management unit 1122 may modify the version of the open data reference model ODRM1 so as to reflect the extension of the domain, classification system, or category of the open data reference model ODRM1 depending on a version management system. The dictionary management unit 1123 may register a term, a word, a vocabulary, a code, or the like corresponding to the extension request in the open data reference model ODRM1 according to a dictionary configuration system. The dictionary management unit 1123 may register a term, a word, a vocabulary, a code, or the like in the open data reference model ODRM1 based on the dictionary configuration system such that an external device such as another open data reference model management device or the data hub device 1200 is capable of referencing the expanded open data reference model ODRM1.

The reference model operating unit 1130 may include an operating environment management unit 1131, a reference model synchronization unit 1132, a data hub management unit 1133, a data hub synchronization unit 1134, and a data hub reference service unit 1135. As in the topology of FIG. 6, the operating environment management unit 1131 may manage the topology of hierarchically-constructed open data reference model management devices. For example, the operating environment management unit 1131 may designate a topic of interest to each of the open data reference model management devices or may change the designated topic of interest.

The reference model synchronization unit 1132 may manage the synchronization between open data reference model management devices in the topology of the open data reference model management devices, based on a change of the open data reference model ODRM1 managed by the open data reference model management device 1110. For example, the reference model synchronization unit 1132 may monitor the synchronization between the upper open data reference model management device (e.g., the open data reference model management device 20-1-11 specified in the classification system CL11 of the domain DM1 of FIG. 6) and the lower open data reference model management device (e.g., the open data reference model management device 20-1-11-11a specified in the '11a' category of the classification system CL11 of the domain DM1 of FIG. 6) or may request the upper open data reference model management device and the lower open data reference model management device to synchronize with each other.

The data hub management unit 1133 may manage datasets in the data hub device 1200 with reference to information received from the open data reference model management unit 1120. For example, the data hub management unit 1133 may receive the open data reference model ODRM1 stored in the open data reference model storage 1128 and information associated with the open data reference model ODRM1 from the open data reference model management unit 1120. The data hub management unit 1133 may classify and manage datasets in the data hub device 1200 for each topic of interest corresponding to the open data reference model ODRM1. The data hub management unit 1133 may classify data hub devices, which generate a data map, from among a plurality of data hub devices (e.g., the data hub device 1200) associated with the open data reference model ODRM1 into topics (i.e., domains, classification systems, categories, and the like) referenced by each of the data hub devices and may manage the classified result.

The data hub synchronization unit 1134 may synchronize a change of the open data reference model ODRM1 corresponding to the extension request with the data hub device 1200. For example, the data hub synchronization unit 1134 may notify data hub devices (e.g., the data hub device 1200), which operate in conjunction with the open data reference model ODRM1, of the extension of the open data reference model ODRM1 based on the open data reference model ODRM1 extended by the open data reference model management unit 1120.

The data hub reference service unit 1135 may provide information of the open data reference model ODRM1 to data hub devices (e.g., the data hub device 1200) operating in conjunction with the open data reference model ODRM1. For example, the data hub reference service unit 1135 may receive an information providing request from the data hub device 1200. The data hub reference service unit 1135 may make a request for the open data reference model ODRM1 stored in the open data reference model management unit 1120 and information associated with the open data reference model ODRM1 to the open data reference model management unit 1120 in response to the information providing request. The data hub reference service unit 1135 may provide the data hub device 1200 with the open data reference model ODRM1 received from the open data reference model management unit 1120 and information associated with the open data reference model ODRM1.

Figure 9:
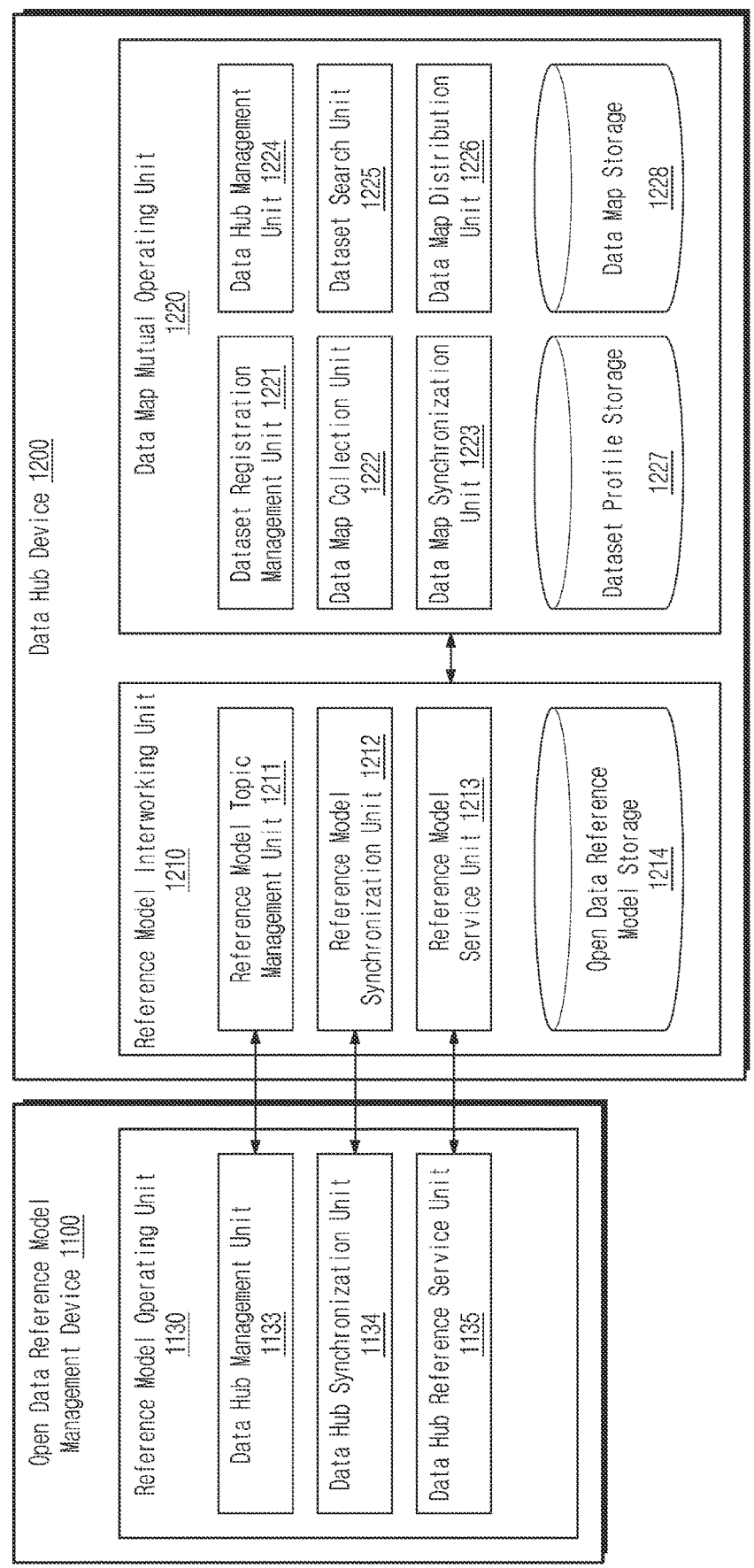
FIG. 9 is a detailed block diagram of a data hub device of FIG. 7, according to an embodiment of the present disclosure.

FIG. 9 is a detailed block diagram of the data hub device 1200 of FIG. 7, according to an embodiment of the present disclosure. Referring to FIGS. 1, 7, 8, and 9, the reference model interworking unit 1210 of the data hub device 1200 may include a reference model topic management unit 1211, a reference model synchronization unit 1212, a reference model service unit 1213, and open data reference model storage 1214.

The reference model topic management unit 1211 may manage a topic of interest of the data hub device 1200. For example, the reference model topic management unit 1211 may select or change a domain, a classification system, or a category associated with the topic of interest of the data hub device 1200. The reference model topic management unit 1211 may register setting information for interworking, such as the topic of interest of the data hub device 1200, a method in which the data hub device 1200 accesses the open data reference model ODRM1, a synchronization period, and the like in the data hub management unit 1133 of the open data reference model management device 1100. The open data reference model management device 1100 may synchronize with the data hub device 1200 based on this setting information.

The reference model synchronization unit 1212 may perform the synchronization with the open data reference model management device 1100. For example, the reference model synchronization unit 1212 may manage (or control) the open data reference model storage 1214 in the data hub device 1200. The reference model synchronization unit 1212 may detect a change in the version of the open data reference model ODRM1 based on an event, an alarm, a notification, or a request from the open data reference model management device 1100. The reference model synchronization unit 1212 may perform synchronization of the changed open data reference model ODRM1.

The reference model service unit 1213 may provide information of the open data reference model ODRM1 to other components of the data hub device 1200. For example, the reference model service unit 1213 may access the open data reference model storage 1214 and may provide other components of the data hub device 1200 with the open data reference model ODRM1 and information associated with the open data reference model ODRM1, which are stored in the open data reference model storage 1214. As another example, the reference model service unit 1213 may make a request for information associated with the open data reference model ODRM1 to the data hub reference service unit 1135 of the open data reference model management device 1100 and may provide other components of the data hub device 1200 with the reference model information provided from the data hub reference service unit 1135. The reference model service unit 1213 may store the reference model information provided from the data hub reference service unit 1135 in the open data reference model storage 1214.

The open data reference model storage 1214 may be a storage device including a volatile memory or a nonvolatile memory, which stores the open data reference model ODRM1 and information associated with the open data reference model ODRM1.

The data map mutual operating unit 1220 of the data hub device 1200 may include a dataset registration management unit 1221, a data map collection unit 1222, a data map synchronization unit 1223, a data hub management unit 1224, a dataset search unit 1225, a data map distribution unit 1226, a dataset profile storage 1227, and data map storage 1228.

On the basis of the reference model information provided from the reference model service unit 1213, the dataset registration management unit 1221 may register a new dataset or may manage an existing dataset. For example, the dataset registration management unit 1221 may store a new dataset collected from the outside of the data hub device 1200 in the dataset profile storage 1227. As another example, the dataset registration management unit 1221 may modify or delete a profile of the dataset stored in the dataset profile storage 1227.

The data map collection unit 1222 may collect a data map from the outside of the data hub device 1200 and may store the collected data map within the data hub device 1200. For example, the data map collection unit 1222 may store the data map collected from the outside in a file state (or in a format of a file) in the data map storage 1228 depending on the registration information of the external data hub device registered in the data hub management unit 1224. With reference to the profile specifications of the open data reference model ODRM1 operating in conjunction with the data hub device 1200, the data map collection unit 1222 may interpret dataset profile information included in the collected data map and may also store the interpreted dataset profile information in the dataset profile storage 1227.

The data map synchronization unit 1223 may perform synchronization of data map information between the data hub device 1200 and the external data hub device. For example, the data map synchronization unit 1223 may notify the external data hub device of the change in the data hub device 1200 in response to registration of a new dataset, modification or deletion of an existing dataset, or modification of profile information.

In some embodiments, the data map synchronization unit 1223 may generate an alarm for a change in data map information. The generated alarm may be delivered to external data hub devices managed by the data hub management unit 1224 through the data hub management unit 1224.

In some embodiments, the data map synchronization unit 1223 may generate event information about the change in data map information. The generated event information may be loaded onto a queue in the data hub management unit 1224. The queue may be accessed or identified periodically by the external data hub devices. The external data hub devices may perform synchronization with the data hub device 1200 in response to the event information loaded onto the queue.

The data hub management unit 1224 may manage an external data hub device capable of sharing a data map with the data hub device 1200. For example, the external data hub device managed by the data hub management unit 1224 may search for a dataset stored in the data hub device 1200 and may access the found dataset. The data hub management unit 1224 may register various pieces of information such as an address, access information, a topic of interest, a search method, a distribution cycle, and the like of the data hub device 1200 in the external data hub device. The data hub management unit 1224 may manage information registered in the data hub device 1200 by the external data hub device. The data hub device 1200 and the external data hub device may share a dataset based on the information.

The dataset search unit 1225 may search for a dataset profile stored in the dataset profile storage 1227 or a data map stored in the data map storage 1228. For example, the dataset search unit 1225 may search for the dataset profile stored in the dataset profile storage 1227 or the data map stored in the data map storage 1228 in response to a search request of other components within the data hub device 1200 or the external data hub device. The search request may include elements necessary for searching for a dataset, such as a domain, a classification system, a category, and a keyword. The dataset search unit 1225 may provide the found result to other components within the data hub device 1200 or to the external data hub device.

The data map distribution unit 1226 may manage the data map storage 1228, and may generate and distribute a data map. For example, the data map distribution unit 1226 may receive a data map request from an external device of the data hub device 1200. The data map distribution unit 1226 may generate a data map corresponding to the data map request, and may provide the generated data map to the external device.

The dataset profile storage 1227 may be a storage device including a volatile memory or a non-volatile memory which stores a dataset including metadata information according to a corresponding profile specification. The data map storage 1228 may be a volatile memory or a non-volatile memory which stores a data map including a dataset described as the corresponding domain, classification system, or category (e.g., a corresponding category and an upper category of the corresponding category), and profile information of the corresponding domain, classification system, or category.

The data map mutual operating unit 1220 of the data hub device 1200 may manage two pieces of storage 1227 and 1228 to improve the efficiency of dataset search, data map creation, and data map distribution. In this case, because the dataset profile information and the data map are based on the same information, mutual conversion may be possible. Accordingly, in some embodiments, the data map mutual operating unit 1220 of the data hub device 1200 may manage only one of the pieces of storages 1227 and 1228. The original data of a dataset may be selectively downloaded and stored from the dataset registration management unit 1221 or the data map collection unit 1222.

Figure 10:
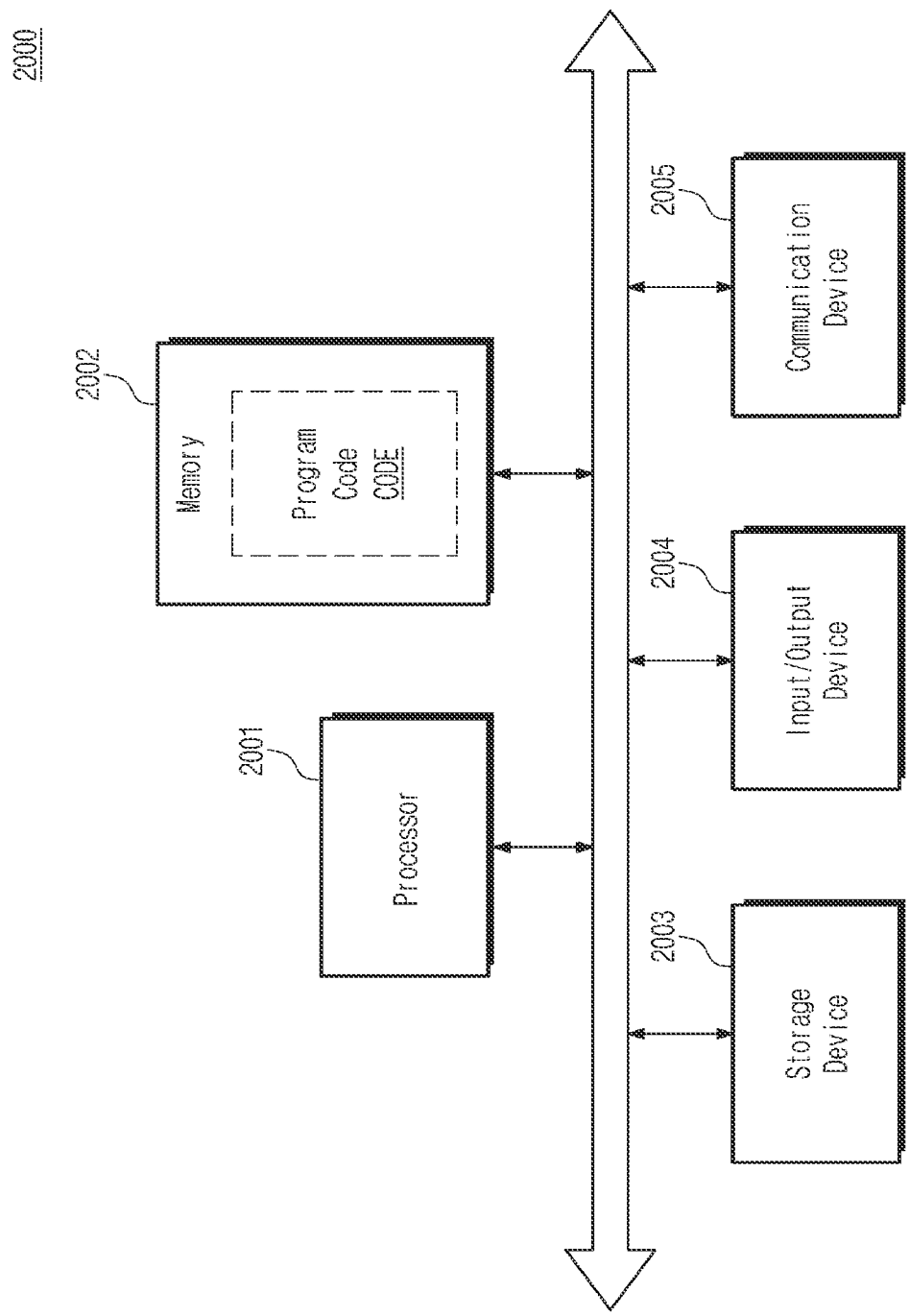
FIG. 10 illustrates a block diagram of an electronic device, according to embodiments of the present disclosure.

FIG. 10 illustrates a block diagram of an electronic device 2000, according to embodiments of the present disclosure. Referring to FIG. 10, the electronic device 2000 may include a processor 2001, a memory 2002, a storage device 2003, an input/output device 2004, and a communication device 2005.

The processor 2001 may function as a central processing unit of the electronic device 2000. For example, as in the above scheme described with reference to FIGS. 7 and 8, the processor 2001 may perform operations for managing the open data reference model ODRM1 of FIG. 1. For example, as in the above scheme described with reference to FIGS. 7 and 9, the processor 2001 may perform operations for managing one data hub operating in conjunction with the open data reference model ODRM1 of FIG. 1. The processor 2001 may control an operation of the electronic device 2000 by executing software, firmware, program codes, or instructions loaded onto the memory 2002.

In some embodiments, under control of the processor 2001, the electronic device 2000 may perform operations similar to operations of the electronic device 1000 described above with reference to FIGS. 7 to 9. For example, the processor 2001 may perform operations similar to operations of the electronic device 1000 described above with reference to FIGS. 7 to 9 by executing a program code CODE loaded onto the memory 2002.

The electronic device 2000 may extend the open data reference model ODRM1 and may manage data hub devices associated with the open data reference model ODRM1 based on the open data reference model ODRM1. The electronic device 2000 may perform synchronization between the open data reference model ODRM1 and data hub devices associated with the open data reference model ODRM1. The electronic device 2000 may collect various datasets based on the open data reference model ODRM1, may store the collected datasets, and may generate and distribute a data map based on the stored datasets.

The memory 2002 may store data and program codes that are processed by the processor 2001 or are scheduled to be processed by the processor 310. For example, the memory 2002 may store data and program codes provided from a user or an external device. The software, firmware, program codes, or instructions for controlling the electronic device 2000 may be loaded onto the memory 2002 under control of the processor 2001. Data stored in the storage device 2003 may be loaded onto the memory 2002 under control of the processor 2001. The memory 2002 may be a main memory device of the electronic device 2000. The memory 2002 may include a dynamic random access memory (DRAM) or a static random access memory (SRAM).

In some embodiments, the memory 2002 may be a non-transitory computer-readable medium storing the program code CODE executable by the processor 2001. The number of the memories 2002 may be one or more.

In some embodiments, the program code CODE may cause the processor 2001 to collect a first dataset based on an open data reference model, to store the first dataset, and to generate a first data map based on the first dataset. Profile information of the first dataset may include metadata information of a profile specification of a first category of the open data reference model and metadata information of a profile specification of a second category, which is an upper category of the first category. The program code CODE may cause the processor 2001 to detect a change in the open data reference model and to perform the changed open data reference model, to collect a second data map from an external data hub device and change the second data map based on a first profile specification of the open data reference model, and to synchronize data map information between the data hub device and the external data hub device. The program code CODE may cause the processor 2001 to search for the profile information of the first dataset and the first data map, which are stored in a storage device, to generate a second data map based on profile information of second dataset stored in the storage device, and to distribute the first data map and the second data map to an external data hub device.

The storage device 2003 may store data generated for long-term storage by the processor 2001, a file to be driven by the processor 2001, or various codes capable of being executed by the processor 2001. For example, under the control of the processor 2001, the storage device 2003 may store program codes or instructions for extending the open data reference model ODRM1, performing synchronization between the open data reference model ODRM1 and data hub devices associated with the open data reference model ODRM1, managing the dataset based on the open data reference model ODRM1, and generating and distributing a data map based on the open data reference model ODRM1. The storage device 2003 may function as an auxiliary memory device of the electronic device 2000. The storage device 2003 may include a flash memory or the like. Unlike the embodiment illustrated in FIG. 10, the storage device 2003 may be implemented as an external device of the electronic device 2000.

In some embodiments, the storage device 2003 may include the open data reference model storage 1128 of FIG. 8, the open data reference model storage 1214 of FIG. 9, the dataset profile storage 1227 of FIG. 9, and/or the data map storage 1228 of FIG. 9.

The input/output device 2004 may include a user interface or a developer interface for communicating with a user of the electronic device 2000. For example, the input/output device 2004 may include at least one of various output devices such as a monitor, a printer, or a lamp. The input/output device 2004 may include at least one of various input devices such as a keyboard, a touchpad, a mouse, and a microphone.

The communication device 2005 may communicate with an external device of the electronic device 2000. For example, under control of the processor 2001, the communication device 2005 may transmit data to an external device or may receive data from the external device, based on various wired or wireless protocols.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

An electronic device according to an embodiment of the present disclosure may manage various types of new data, and may share the new data with an external data hub device. The electronic device may manage a profile specification for a dataset, may manage the dataset in a standardized manner operating in conjunction with the profile specification, may generate a data map, and may distribute the generated data map. Accordingly, it is possible to automate data standards and dataset management depending on data industry environments, thereby improving the efficiency of open data management.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
an open data reference model management device configured to subdivide and manage a classification system for each domain of an open data reference model into categories of a hierarchical structure; and
a data hub device configured to:
collect a first dataset based on the open data reference model;
store the first dataset; and
generate a first data map based on the first dataset;
detect a change in the open data reference model and perform the changed open data reference model;
collect a second data map from an external data hub device and change the second data map based on a first profile specification of the open data reference model;
synchronize data map information between the data hub device and the external data hub device; and
generate event information in response to a change in the data map information of the data hub device by synchronizing the data map information and load the event information onto a queue in a data map synchronization unit of the data hub device,
wherein profile information of the first dataset includes metadata information of a profile specification of a first category of the open data reference model and metadata information of a profile specification of a second category, which is an upper category of the first category, and
wherein the queue is accessed periodically by the external data hub device.

2. The electronic device of claim 1, wherein the open data reference model management device includes an extension request input unit configured to receive an extension request for the open data reference model from an outside of the electronic device, and wherein the extension request includes a request for adding, modifying or deleting one of a domain, a classification system, or a category for the open data reference model.

3. The electronic device of claim 2, wherein the open data reference model management device further includes an open data reference model management unit configured to manage the open data reference model in response to the extension request, and wherein the open data reference model management unit includes:
an extension management unit configured to receive the extension request and a metadata schema corresponding to the extension request from the extension request input unit;
a domain management unit configured to receive the extension request and the metadata schema from the extension management unit and to modify a domain of the open data reference model based on the extension request and the metadata schema;
a classification system management unit configured to modify a classification system of the domain based on the open data reference model modified by the domain management unit, the extension request, and the metadata schema;
a category management unit configured to modify a category of the classification system based on the open data reference model further modified by the classification system management unit, the extension request, and the metadata schema; and
a profile management unit configured to modify a profile specification of the category based on the open data reference model further modified by the category management unit, the extension request, and the metadata schema.

4. The electronic device of claim 3, wherein the open data reference model management unit further includes:
a version management unit configured to modify a version of the open data reference model based on the open data reference model further modified by the profile management unit; and
a dictionary management unit configured to register a term, a word, a vocabulary, or a code in a dictionary of the open data reference model based on the open data reference model further modified by the profile management unit.

5. The electronic device of claim 3, wherein the open data reference model management unit further includes:
an open data reference model storage configured to store the open data reference model further modified by the profile management unit.

6. The electronic device of claim 1, wherein the open data reference model management device further includes:
an operating environment management unit configured to manage operating environments of a first device managing a first domain of the open data reference model, a second device managing a first classification system of the first domain, a third device managing a second classification system of the first domain, and a fourth device managing a first category of the first classification system; and
a reference model synchronization unit configured to direct synchronization between two devices among the first to fourth devices,
wherein the reference model synchronization unit is further configured to direct synchronization between the second device and the fourth device and synchronization between the second device and the first device in response to modification of the first classification system of the open data reference model.

7. The electronic device of claim 1, wherein the open data reference model management device further includes:
a data hub management unit configured to manage the data hub device based on a topic of interest of the data hub device;
a data hub synchronization unit configured to perform synchronization with the data hub device in response to extension of the open data reference model; and
a data hub reference service unit configured to provide the data hub device with information of the open data reference model in response to a request of the data hub device, and
wherein the topic of interest of the data hub device is at least one of a domain, a classification system, and a category of the open data reference model.

8. The electronic device of claim 1, wherein the data hub device includes:
a reference model topic management unit configured to register information associated with a topic of interest of the data hub device in the open data reference model management device.

9. The electronic device of claim 1, wherein the data hub device includes:
a reference model synchronization unit configured to detect the change in the open data reference model by the open data reference model management device and to perform synchronization of the changed open data reference model.

10. The electronic device of claim 1, wherein the data hub device includes:
a reference model service unit configured to make a request for information of the open data reference model to the open data reference model management device and to receive the requested information.

11. The electronic device of claim 10, wherein the data hub device further includes:
an open data reference model storage configured to store the requested information.

12. The electronic device of claim 1, wherein the data hub device includes:
a data hub management unit configured to register information of the data hub device in the external data hub device and to register information of the external data hub device in the data hub device; and
a data map collection unit configured to collect the second data map from the external data hub device based on the open data reference model and to change the second data map based on the first profile specification of the open data reference model.

13. The electronic device of claim 12, wherein the data hub device includes:
the data map synchronization unit, the data map synchronization unit being configured to synchronize the data map information between the data hub device and the external data hub device.

14. The electronic device of claim 13, wherein the data map synchronization unit is further configured to generate an alarm in response to the change in the data map information of the data hub device and to deliver the alarm to the external data hub device.

15. The electronic device of claim 1, wherein the data hub device includes:
a dataset profile storage configured to store the profile information of the first dataset;

a data map storage configured to store the first data map; and a dataset search unit configured to search for the profile information of the first dataset stored in the dataset profile storage or the first data map stored in the first data map storage.

16. The electronic device of claim 15, wherein the data hub device further includes:

a data map distribution unit configured to generate the second data map based on profile information of a second dataset stored in the dataset profile storage, and to distribute the first data map and the second data map to the external data hub device.

17. A non-transitory computer-readable storage medium storing a program code capable of being executed by a processor, wherein the program code causes the processor to:

collect a first dataset based on an open data reference model;

store the first dataset;

generate a first data map based on the first dataset;

detect a change in the open data reference model and perform the changed open data reference model;

collect a second data map from an external data hub device and change the second data map based on a first profile specification of the open data reference model;

synchronize data map information between the data hub device and the external data hub device; and generate event information in response to a change in the data map information of the data hub device by synchronizing the data map information and load the event information onto a queue in a data map synchronization unit of the data hub device, wherein profile information of the first dataset includes metadata information of a profile specification of a first category of the open data reference model and metadata information of a profile specification of a second category, which is an upper category of the first category, and wherein the queue is accessed periodically by the external data hub device.

18. The non-transitory computer-readable storage medium of claim 17, wherein the program code further causes the processor to:

search for the profile information of the first dataset and the first data map, which are stored in a storage device;

generate a second data map based on profile information of second dataset stored in the storage device; and distribute the first data map and the second data map to an external data hub device.

* * * * *